(12) United States Patent
Mori

(10) Patent No.: US 8,270,105 B2
(45) Date of Patent: Sep. 18, 2012

(54) LENS DEVICE

(75) Inventor: Yoshitaka Mori, Saitama (JP)

(73) Assignee: Fujifilm Corporation, Tokyo (JP)

( * ) Notice: Subject to any disclaimer, the term of this patent is extended or adjusted under 35 U.S.C. 154(b) by 74 days.

(21) Appl. No.: 12/860,540

(22) Filed: Aug. 20, 2010

(65) Prior Publication Data

US 2011/0043936 A1 Feb. 24, 2011

(30) Foreign Application Priority Data

Aug. 21, 2009 (JP) ................................ 2009-192302

(51) Int. Cl.
*G02B 7/02* (2006.01)
*G02B 15/14* (2006.01)

(52) U.S. Cl. ....................................... 359/825; 359/694

(58) Field of Classification Search .......... 359/694–704, 359/811–830
See application file for complete search history.

(56) References Cited

U.S. PATENT DOCUMENTS

| 5,239,417 | A | 8/1993 | Eguchi et al. |
| 5,565,948 | A | 10/1996 | Kume et al. |
| 5,719,712 | A | 2/1998 | Ishikawa |
| 6,768,596 | B2 * | 7/2004 | Hattori et al. ................. 359/694 |
| 6,788,890 | B2 * | 9/2004 | Suzuki .......................... 396/137 |
| 2002/0187001 | A1 | 12/2002 | Hattori et al. |
| 2007/0074966 | A1 | 4/2007 | Yamamoto et al. |

FOREIGN PATENT DOCUMENTS

| JP | 2005-62385 A | 3/2005 |
| JP | 2007-219023 A | 8/2007 |

* cited by examiner

*Primary Examiner* — Mohammed Hasan
(74) *Attorney, Agent, or Firm* — Birch, Stewart, Kolasch & Birch, LLP

(57) ABSTRACT

Disclosed is a lens device including a click mechanism of a ring member that is rotated with respect to a lens barrel body, slides in the optical axis direction, has high slidability during a click operation and high durability, and can prevent one-sided abrasion due to the inclination of the ring member. A click mechanism of a first focus ring includes: elastic members for clicking provided at three equally divided positions on the circumference of a front fixed ring of a lens barrel body; and a contact portion that is formed in a central portion of the inner circumferential surface of the first focus ring and comes into contact with a convex portion of the elastic member for clicking. The elastic member for clicking is made of polyacetal with high slidability. Therefore, it is possible to reduce the abrasion of the elastic member for clicking during a click operation.

8 Claims, 7 Drawing Sheets

RELATED ART

LENS DEVICE

CROSS-REFERENCE TO RELATED APPLICATIONS

This application is based upon and claims the benefit of priority from the Japanese Patent Application No. 2009-192302 filed on Aug. 21, 2009; the entire contents of which are incorporated herein by reference.

BACKGROUND OF THE INVENTION

1. Field of the Invention

The present invention relates to a lens device, and more particularly, to a click mechanism of a ring member of a lens device.

2. Description of the Related Art

JP-A-2007-219023 discloses a lens device used in a portable ENG (Electronic News Gathering) camera for television news. The lens device has a first MF mode that outputs an absolute position signal corresponding to the rotational position of a focus ring as an instruction to move the focus lens and a second MF mode that outputs a relative position signal corresponding to the amount of rotation of the focus ring as an instruction to move the focus lens, during a manual focus (MF) operation that manually operates the focus ring to move the focus lens, thereby adjusting focus.

FIG. 7 is an enlarged cross-sectional view illustrating a main part of the lens device disclosed in JP-A-2007-219023.

In the lens device, a first focus ring 4 and a second focus ring 5 are provided around a lens barrel body including, for example, a front frame 2 and a fixed ring 3. The first focus ring 4 is provided so as to be rotatable with respect to the lens barrel body and slidable in the optical axis direction. The second focus ring 5 is provided so as to be rotatable with respect to the lens barrel body only in a predetermined rotation range.

Gears 4A and 5A, which are clutch portions, are provided in portions of the first focus ring 4 and the second focus ring 5 facing each other. When the first focus ring 4 slides in the right direction of FIG. 7, the gear 4A is engaged with the gear 5A and the first focus ring 4 is connected to the second focus ring 5. In the state shown in FIG. 7, the gear 4A is disengaged from the gear 5A and the first focus ring 4 and the second focus ring 5 are not connected to each other.

During MF, when the first focus ring 4 and the second focus ring 5 are connected to each other, the operation mode is the first MF mode that outputs the absolute position signal corresponding to the rotational position of the second focus ring 5 as an instruction to move the focus lens. On the other hand, when the first focus ring 4 is not connected to the second focus ring 5, the operation mode is the second MF mode that outputs the relative position signal corresponding to the amount of rotation of the first focus ring 4 as an instruction to move the focus lens.

A cantilever-shaped cutout 4B for clicking is provided at the end of the first focus ring 4 opposite to the gear 4A, and a convex portion 2A that is fitted to the cutout 4B is provided on the front frame 2 facing the cutout 4B.

The cutout 4B for clicking formed in the first focus ring 4 and the convex portion 2A formed on the front frame 2 form a click mechanism. When the first focus ring 4 is moved to a first slide position where the first focus ring 4 is connected to the second focus ring 5 or a second slide position (state shown in FIG. 7) where the first focus ring 4 is not connected to the second focus ring 5, the click operation of the first focus ring 4 is performed by the click mechanism.

In the click mechanism of the lens device according to the related art, the cutout 4B for clicking is formed integrally with the first focus ring 4. Therefore, it is possible to reduce the number of parts. However, the click mechanism has the following problems.

The click mechanism has a problem in that it is difficult to obtain an initial click feeling with the use of the first focus ring 4. The reason is that the first focus ring 4 has the same linear expansion coefficient as the lens barrel body (for example, the front frame 2 and the fixed ring 3) made of an aluminum alloy and is generally made of, for example, polycarbonate in order to ensure strength and the cutout 4B for clicking which is made of, for example, polycarbonate gradually abrades with an increase in the number of click operations.

Six cutouts 4B for clicking are formed in the circumference of the first focus ring 4. During the slide operation of the first focus ring 4, the cutouts 4B only on one side (some cutouts) abrade due to the inclination of the first focus ring 4. It is considered that the inclination of the first focus ring 4 is caused because the cutout 4B for clicking is provided at the end of the first focus ring 4 and the contact width of the first focus ring 4 with the lens barrel body (the front frame 2 and the fixed ring 3) is small or because the first focus ring 4 slides on the front frame 2 and the fixed ring 3 and there is a step difference between the sliding surfaces of the front frame 2 and the fixed ring 3.

The cutout 4B for clicking is formed integrally with the first focus ring 4. Therefore, in order to determine an optimal click force, it is necessary to manufacture first focus ring samples including the cutouts 4B with different thicknesses, which results in an increase in manufacturing costs.

SUMMARY OF THE INVENTION

The invention has been made in order to solve the above-mentioned problems and an object of the invention is to provide a lens device including a click mechanism of a ring member that is rotated with respect to a lens barrel body, slides in the optical axis direction, has high slidability during a click operation and high durability, and can prevent one-sided abrasion due to the inclination of the ring member.

According to a first aspect of the invention, a lens device includes: a ring member that is provided so as to be rotatable with respect to a lens barrel body and slidable in an optical axis direction; and a click mechanism that allows the ring member to perform a click operation when the ring member is moved to a first slide position or a second slide position. The click mechanism includes: elastic members for clicking which have an arc shape and are provided at a plurality of equally divided positions on the circumference of the lens barrel body and each of which has one end fixed to the lens barrel body and the other end slidably contacted with the surface of the lens barrel body and includes a convex portion formed on an upper surface of a central portion and a bending space formed by reducing the thickness of a portion other than both ends; and a contact portion that is formed along a central portion of an inner circumferential surface of the ring member, comes into contact with the convex portion of the elastic member for clicking when the ring member is moved to the first slide position or the second slide position to bend the elastic member for clicking, and rides over the convex portion.

According to the first aspect of the invention, the elastic member for clicking that is provided separately from the ring member is used. It is possible to select a material forming the elastic member for clicking that is suitable for a click operation, without being restricted by the ring member. In addition, the contact portion that comes into contact with the convex portion of the elastic member for clicking the ring member is formed in a central portion of the inner circumferential surface of the ring member. Therefore, when the ring member is moved (slides) in the optical axis direction, the ring member can slide while coming into contact with the width range of the ring member in the optical axis direction and it is possible to prevent the ring member from being inclined during the sliding of the ring member (that is, it is possible to prevent one-sided abrasion due to the inclination of the ring member). However, the central portion of the inner circumferential surface of the ring member means a portion of the inner circumferential surface other than the portion, which is a sliding surface, of the inner circumferential surface of the ring member in the vicinity of both ends.

It is possible to easily change the setting of the click force by changing the thickness of the elastic member for clicking.

According to a second aspect of the invention, in the lens device according to the first aspect, the elastic member for clicking may be made of plastic with high slidability.

According to a third aspect of the invention, in the lens device according to the first or second aspect, the ring member may be made of polycarbonate, and the elastic member for clicking may be made of polyacetal. When the ring member is made of polycarbonate, it is possible to make the linear expansion coefficient of the ring member equal to that of the lens barrel body made of an aluminum alloy and it is possible to prevent the rattling of the ring member due to a temperature variation. In addition, it is possible to ensure desired strength. When the elastic member for clicking is made of polyacetal with high slidability, it is possible to minimize the abrasion of the elastic member for clicking due to a click operation.

According to a fourth aspect of the invention, in the lens device according to any one of the first to third aspects, the elastic members for clicking may be provided at three equally divided positions on the circumference of the lens barrel body. In this way, it is possible to apply a uniform click force to the ring member during a click operation by the sliding of the ring member and prevent the ring member from being inclined due to the click force.

According to a fifth aspect of the invention, in the lens device according to any one of the first to fourth aspects, the convex portion formed at the center of the upper surface of the elastic member for clicking may have a semicylindrical shape. In this way, the convex portion of the elastic member for clicking comes into line contact with the contact portion of the ring member and is less likely to abrade.

According to a sixth aspect of the invention, in the lens device according to any one of the first to fifth aspects, a groove having a width and depth corresponding to the width and maximum thickness of the elastic member for clicking may be formed around the lens barrel body, and the elastic members for clicking may be provided along the groove. In this way, it is possible to accurately provide the elastic members for clicking each having one fixed end along the circumferential direction of the lens barrel body.

According to a seventh aspect of the invention, the lens device according to any one of the first to sixth aspects may further include: a first focus ring that is the ring member; a second focus ring that is provided so as to be rotatable with respect to the lens barrel body only in a predetermined rotation range; a clutch unit that connects the first focus ring to the second focus ring or disconnects the first focus ring from the second focus ring with the movement of the first focus ring to the first slide position or the second slide position in the optical axis direction; and a focus mode switching unit that performs switching between a first focus mode that outputs an absolute position signal corresponding to the rotational position of the second focus ring when the first focus ring is moved to the first slide position as an instruction to move a focus lens and a second focus mode that outputs a relative position signal corresponding to the amount of rotation of the first focus ring when the first focus ring is moved to the second slide position as an instruction to move the focus lens.

According to an eighth aspect of the invention, the lens device according to the seventh aspect, each of the first focus ring and the second focus ring may be provided on one fixed ring forming the lens barrel body. When each of the first focus ring and the second focus ring is provided on one fixed ring, it is possible to accurately arrange each of the rings.

According to the above-mentioned aspects of the invention, the click mechanism of the ring member that is rotated with respect to the lens barrel body and slides in the optical axis direction has a structure in which a plurality of elastic members for clicking is provided separately from the ring member and is arranged at the equally divided positions on the circumference of the lens barrel body and the contact portion which comes into contact with the convex portion of the elastic member for clicking is formed in the central portion of the inner circumferential surface of the ring member. According to this structure, it is possible to select a material with high slidability for the elastic member for clicking and reduce abrasion during a click operation. In addition, it is possible to prevent one-sided abrasion due to the inclination of the ring member during a sliding operation and maintain a desired click force.

DESCRIPTION OF THE PREFERRED EMBODIMENTS

Hereinafter, a lens device according to an embodiment of the invention will be described with reference to the accompanying drawings.

[Overall Structure of Lens Device]

Figure 1:
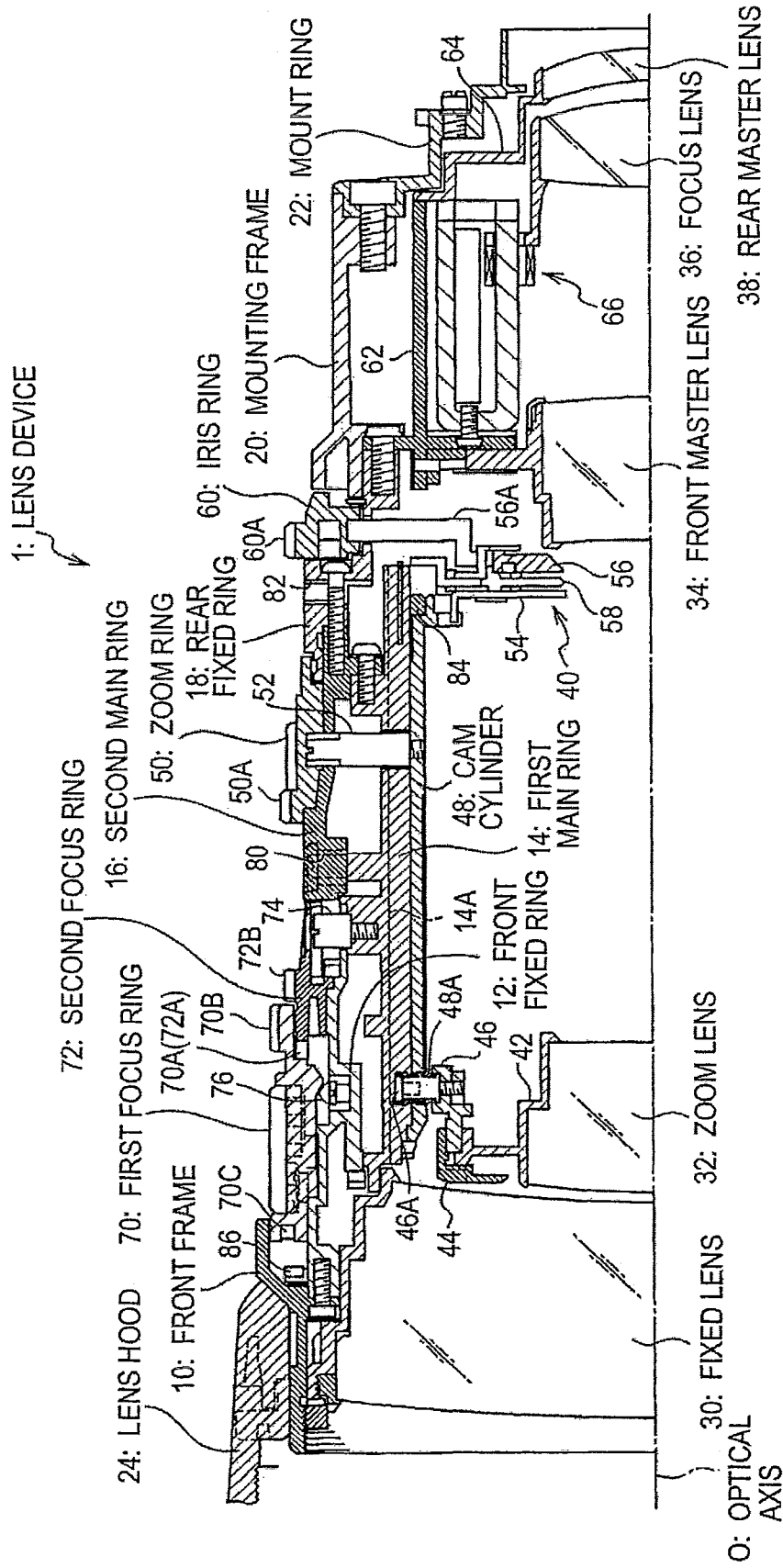
FIG. 1 is a side cross-sectional view illustrating a lens device according to an embodiment of the invention.

FIG. 1 is a side cross-sectional view illustrating a rear-focus-type lens device with a variable focal length according to an embodiment of the invention which is applied to, for example, a household video camera, an ENG camera for television broadcasting, or a monitoring camera and shows the upper half of the lens device from an optical axis O.

In FIG. 1, a lens barrel body of a lens device 1 has a substantially cylindrical shape and mainly includes a front frame 10, a front fixed ring 12, a first main ring 14, a second main ring 16, a rear fixed ring 18, a mounting frame 20, and a mount ring 22.

The first main ring 14 is a component that is disposed on the innermost side of the lens barrel body. The front fixed ring 12 is fixed to the front side of the outer circumference of the first main ring 14 by a screw and the front frame 10 is fixed to the front side of the front fixed ring 12 by a screw. The second main ring 16 is fixed to the rear side of the outer circumference of the first main ring 14 by a screw. In addition, the rear fixed ring 18 is fixed to the rear side of the second main ring 16 by a screw, the mounting frame 20 is fixed to the rear side of the rear fixed ring 18 by a screw, and the mount ring 22 is fixed to the rear side of the mounting frame 20 by a screw.

A lens hood 24 is mounted to the front frame 10. The lens device 1 is mounted to a camera body with interchangeable lenses through the mount ring 22.

An optical system of the lens device 1 includes five groups, that is, a fixed lens (first lens group) 30, a zoom (power variable) lens (second lens group) 32, a front master lens (third lens group) 34, a focus lens (fourth lens group) 36, and a rear master lens (fifth lens group) 38 which are arranged in this order from an object side. An iris diaphragm 40 is provided immediately before the front master lens 34.

A lens frame 42 to which the zoom lens 32 is attached is fixed to a moving frame 46 by a pressing ring 44. A cam cylinder 48 is rotatably held by an inner circumferential portion of the first main ring 14, and the moving frame 46 is held by the inner circumferential portion of the cam cylinder 48 through a cam pin 46A.

That is, a straight-ahead groove 14A is formed in the inner circumferential surface of the first main ring 14 in the direction of the optical axis O and a cam groove (cam-shaped hole) 48A is formed in the cam cylinder 48. The cam pin 46A fixed to the moving frame 46 is fitted to the straight-ahead groove 14A of the first main ring 14 through the cam groove 48A of the cam cylinder 48. In this way, the moving frame 46 is held so as to be movable straight in the direction of the optical axis O while the rotation thereof is restricted, and the cam pin 46A is held at the position where it is fitted to the cam groove 48A.

Therefore, when the cam cylinder 48 is rotated, the position where the cam groove 48A of the cam cylinder 48 intersects the straight-ahead groove 14A of the first main ring 14 is changed according to the shape of the cam and the moving frame 46 is moved forward and backward in the direction of the optical axis O by the movement of the cam pin 46A to the intersection position.

A zoom ring 50 is rotatably provided in the outer circumferential portion of the second main ring 16 and a rod-shaped connection shaft 52 is attached to the inner circumferential surface of the zoom ring 50 inward in the diametric direction. The connection shaft 52 passes through a long hole (not shown) that is formed in the first main ring 14 in the circumferential direction and is then connected to the cam cylinder 48. In this way, when the zoom ring 50 is rotated, the cam cylinder 48 is rotated in operative association with the movement of the zoom ring 50. When the cam cylinder 48 is rotated, the moving frame 46 is moved forward and backward as described above and the zoom lens 32 is moved in the direction of the optical axis O in operative association with the movement of the moving frame 46. Therefore, the zoom ring 50 is rotated to change the zoom ratio.

The iris diaphragm 40 mainly includes a bottom board (diaphragm frame) 54 made of plastic, a sliding plate (cam plate) 56, and a plurality of diaphragm blades 58 provided between the diaphragm frame 54 and the cam plate 56. An iris ring 60 is rotatably provided between the rear fixed ring 18 and the mounting frame 20 and a connection shaft 56A extending from the cam plate 56 is connected to the iris ring 60. In this way, the cam plate 56 is rotated by the rotation of the iris ring 60 and the diaphragm blades 58 are opened or closed.

The focus lens 36 changes the focus position of the optical system and is supported so as to be movable in the direction of the optical axis O by a guide shaft and a baffle (not shown) held between a holding frame 62 that holds, for example, the front master lens 34 and a lens frame 64 of the rear master lens 38 that is provided at the rear end of the holding frame 62. A pair of voice coil motors (VCMs) 66 is provided in the holding frame 62 with the guide shaft interposed therebetween. The focus lens 36 is operated by the electrical driving force of the VCM 66.

A first focus ring 70 and a second focus ring 72 are rotatably provided in an outer circumferential portion of the front fixed ring 12. The first focus ring 70 is arranged such that it can be endlessly rotated without any restrictions in the rotation range and slide in the optical axis direction. In addition, the second focus ring 72 is regulated by a stopper shape 74 such that it can be rotated in a range of about 120 degrees.

Sawtooth clutch portions 70A and 72A are formed on end surfaces facing the first focus ring 70 and the second focus ring 72, respectively. In the state shown in FIG. 1, the clutch portions 70A and 72A are connected to each other (engaged with each other) and the first focus ring 70 and the second focus ring 72 are integrally rotated. Therefore, in this state, it is possible to manually rotate the first focus ring 70 only in the range of about 120 degrees.

When the first focus ring 70 slides forward so as to ride over an elastic member 76 for clicking, the clutch portions 70A and 72A are disengaged from each other. In this way, the first focus ring 70 can be rotated endlessly. However, a click mechanism of the first focus ring 70 including the elastic member 76 for clicking will be described in detail below.

A driving portion (not shown) that also serves as a grip portion is attached to the side surface of the lens device 1 having the above-mentioned structure through screw holes 80 and 82.

The driving portion includes a driving unit for driving the zoom ring 50 and the iris ring 60 and has a control board provided therein. The driving portion is electrically driven by a seesaw-type zoom switch to control the driving of the zoom lens 32 and controls the focus lens 36 or the iris diaphragm 40.

<Various Detecting Units>

A linear potentiometer is provided on the outer circumferential surface of the first main ring 14 along the optical axis direction. When the zoom lens 32 is moved in the optical axis direction by the rotation of the cam cylinder 48, the linear potentiometer (zoom linear POT) outputs a position signal (a signal indicating an absolute position) corresponding to the moved position to the driving portion through a lead line.

A magnetic ring 84 having the N-pole and the S-pole magnetized thereto is adhered to the rear end surface of the cam cylinder 48. A magnetic sensor (MR sensor) is provided on the first main ring 14 so as to face the magnetic ring 84. When the magnetic ring 84 is rotated together with the cam cylinder 48, the MR sensor outputs a pulse signal (a signal indicating a relative position) with pulses corresponding to the amount of rotation to the driving portion through the lead line.

The output of the zoom linear POT is used when power is turned on and the output of a zoom position detecting MR sensor is used after power is turned on.

A focus lens position detecting MR sensor is provided in the holding frame 62 that faces a guide shaft of the focus lens 36. The MR sensor outputs a pulse signal (a signal indicating the relative position) with pulses whose number corresponds to the amount of movement of the focus lens 36 to the driving portion through the lead line. A home position sensor (photo interrupter) for detecting the reference position of the focus lens 36 is provided in the holding frame 62. The driving portion counts the output signal of the MR sensor with respect to the reference position of the focus lens 36 detected by the home position sensor, thereby detecting the absolute position of the focus lens 36.

Gears 70B and 72B are respectively formed around the first focus ring 70 and the second focus ring 72. The gears 70B and 72B are respectively connected to gears of the detection shafts of the relative position detecting sensor (incremental encoder) and the absolute position detecting sensor (absolute encoder) provided in the driving portion.

In this way, the driving portion can detect the relative amount of rotation of the first focus ring 70 and also detect the absolute rotational position of the second focus ring 72.

A photo interrupter 86 is provided at the leading end of the front fixed ring 12. A light shielding plate 70C is provided at the leading end of the first focus ring 70. The photo interrupter 86 outputs a detection signal indicating whether there is the light shielding plate 70C to the driving portion. In this way, the driving portion can detect whether the first focus ring 70 is connected to the second focus ring 72 on the basis of the detection signal from the photo interrupter 86.

[Lens Control]

A slide-type macro ON/OFF switch, an AF/MF switch, and a non-locking AF push switch are provided on the side surface of the mounting frame 20. When these switches are operated, output signals are transmitted to the driving portion through the lead lines.

The macro ON/OFF switch is for turning on or off the macro imaging mode. The AF/MF switch is for switching the operation mode between the auto-focus (AF) mode that automatically moves the focus lens 36 to adjust focus such that the contrast of an object image is the maximum and the manual focus (MF) mode in which the user manually rotates the first focus ring to move the focus lens 36, thereby adjusting focus. The AF push switch is for switching the operation mode to the AF mode during the period for which a key top is pushed when the operation mode is switched to the MF mode by the AF/MF switch.

<Focus Control>

When the operation mode is switched to the AF mode by the AF/MF switch, the driving portion performs AF control to automatically move the focus lens 36 to the focus position regardless of the operation of the first focus ring 70 and the second focus ring 72.

When the operation mode is switched to the MF mode by the AF/MF switch, switching between the full MF mode (with an end) and the AF/MF mode (endless) is performed according to the slide position of the first focus ring 70.

That is, the driving portion can detect the slide position of the first focus ring 70 (whether the first focus ring 70 is connected to the second focus ring 72) on the basis of the detection signal from the photo interrupter 86. When the first focus ring 70 is connected to the second focus ring 72, the operation mode is switched to the full MF mode. When the first focus ring 70 is not connected to the second focus ring 72, the operation mode is switched to the AF/MF mode.

In the full MF mode in which the first focus ring 70 is connected to the second focus ring 72, the driving portion controls the driving of the focus lens 36 on the basis of an absolute position signal (a signal indicating the object distance in the range from a near point to infinity) from the absolute position detecting sensor that is connected to the gear 72B of the second focus ring 72 and a signal (a signal indicating the zoom ratio) indicating the absolute position of the zoom position obtained from the output of the zoom linear POT when power is turned on and the output of the zoom position detecting MR sensor after power is turned on. That is, the movement position of the focus lens 36 corresponding to the object distance is set according to the current zoom position (zoom ratio) of the zoom lens 32 in advance, and when the second focus ring 72 is rotated in operative association with the manual operation of the first focus ring 70, the driving portion moves the focus lens 36 to a corresponding position on the basis of a signal (a signal indicating the object distance) indicating the rotational position and the current zoom ratio.

As such, when the operation mode is switched to the full MF mode, it is possible to manually operate the first focus ring 70 to move the focus lens 36 to a position corresponding to a desired object distance. However, since the first focus ring 70 is connected to the second focus ring 72 with an end where the rotation range is restricted by the stopper shaft 74, the rotation range of the first focus ring 70 is restricted similar to the second focus ring 72 such that the first focus ring 70 can be rotated in a rotation range corresponding to the range from the near end to the infinite end.

In the full MF mode, the rotation range of the first focus ring 70 is restricted by the second focus ring 72, and the operator can recognize whether the focus lens 36 reaches the near end or the infinite end on the basis of an operational feeling when the first focus ring 70 reaches the end. The method of using only the first focus ring 70 to adjust focus is generally used by the camera man.

In the AF/MF mode in which the first focus ring 70 is not connected to the second focus ring 72, it is possible to perform focus control by appropriately using the MF mode in which the user rotates the first focus ring 70 to move the focus lens 36 and the AF mode performed when the AF push switch is pushed.

That is, when the first focus ring 70 is operated in the AF/MF mode and a relative position signal is input from the relative position detecting sensor connected to the gear 70B of the first focus ring 70, the driving portion controls the driving of the focus lens 36 on the basis of the relative position signal and moves the focus lens 36 by a distance corresponding to amount of rotation of the first focus ring 70.

However, in the AF/MF mode, since the first focus ring 70 is not connected to the second focus ring 72, the first focus ring 70 can be endlessly rotated without any restriction in the rotation range. When the focus lens 36 is moved up to the infinite end or the near end, the driving portion does not output an instruction to move over the end.

In the AF/MF mode, when the AF push switch is pushed to temporarily switch the operation mode to the AF mode and the user takes the hand off the AF push switch to switch the operation mode to the MF mode, it is possible to displace the focus lens 36 by a distance corresponding to the operation of the first focus ring 70 from the position of the focus lens 36 that is automatically focused by the AF mode. Therefore, it is possible to improve user convenience.

<Zoom Control>

When the seesaw-type zoom switch provided in the driving portion is operated, the rotational force of the electric motor in the driving portion is transmitted to the gear 50A that is formed around the zoom ring 50 to rotate the zoom ring 50. In addition, it is possible to manually operate the zoom ring 50 (a zoom lever (not shown) provided in the zoom ring 50) to rotate the zoom ring 50.

When the zoom ring 50 is rotated, the cam cylinder 48 connected to the zoom ring 50 through the connection shaft 52 is rotated. When the cam cylinder 48 is rotated, the moving frame 46 is moved forward and backward in the direction of the optical axis O through the straight-ahead groove 14A formed in the first main ring 14 and the cam pin 46A fitted to the cam groove 48A of the cam cylinder 48. As such, it is possible to rotate the zoom ring 50 to move the zoom lens 32 in the direction of the optical axis O, thereby changing the zoom ratio.

When the zoom ratio is changed by the movement of the zoom lens 32 in this way, the focal plane is moved. The driving portion controls the position of the focus lens 36 which is used as a correction optical system for correcting the movement of the focal plane due to the change in the zoom ratio such that the focal plane is not moved regardless of the zoom ratio.

That is, the driving portion acquires the current zoom position of the zoom lens 32 before a zooming operation from the output of the zoom linear POT when power is turned on and the output of the zoom position detecting MR sensor after power is turned on, and acquires the current position of the focus lens 36 from the output of the focus lens position detecting MR sensor. Then, the driving portion selects a corresponding correction curve from the correction curves indicating the relationship between the focus lens position and the zoom position where the focal plane prepared for each object distance in advance is not moved, on the basis of the acquired zoom position and focus lens position. When the amount of movement of the zoom lens 32 is detected on the basis of the output signal of the zoom lens position detecting MR sensor, the driving portion reads a focus lens position (focus lens position where the focal plane is not moved) corresponding to the detected zoom position from the selected correction curve and moves the focus lens 36 to the read focus lens position.

In this way, it is possible to prevent the movement of the focal plane (defocus) even though the zoom ratio is changed after focus is adjusted such that the focal plane is disposed on an imaging device of a camera body having the lens device 1 mounted thereto by focus control.

In this way, it is possible to prevent the movement of the focal plane even though the zoom ratio is changed. Therefore, once focus is adjusted such that the focal plane is disposed on the imaging device of the camera body having the lens device 1 mounted thereto by focus control, it is possible to prevent defocusing even though a zoom operation is performed.

[Embodiments]

Next, the click mechanism of the first focus ring 70 applied to the lens device 1 having the above-mentioned structure will be described in detail.

Figure 2:
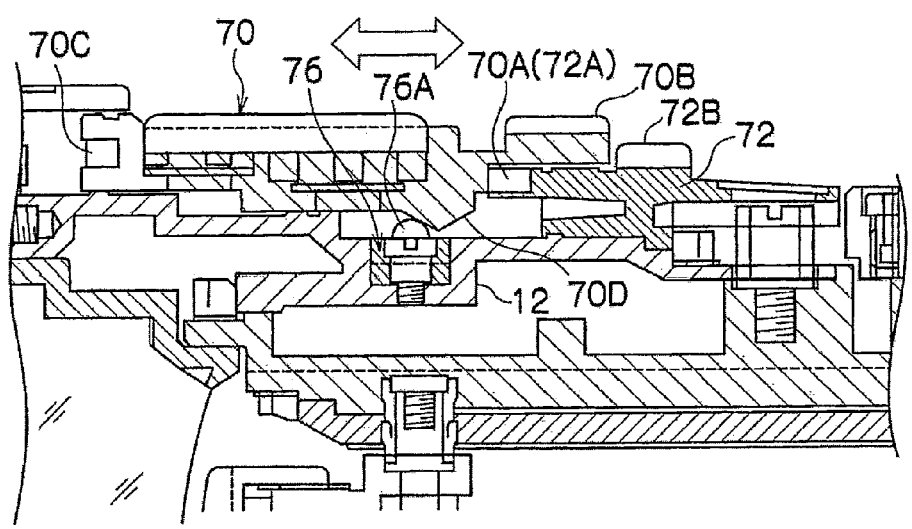
FIG. 2 is an enlarged cross-sectional view illustrating a main part of the lens device shown in FIG. 1.

FIG. 2 is an enlarged side cross-sectional view illustrating a main part of the lens device shown in FIG. 1.

The front fixed ring 12 forming a portion of the lens barrel body is made of an aluminum alloy. The elastic members 76 for clicking are provided at three equally divided portions on the circumference of the front fixed ring 12.

A contact portion 70D with a triangular shape in a cross-sectional view having two inclined planes is formed substantially at the center of the inner circumferential surface of the first focus ring 70.

The first focus ring 70 is provided such that it can slide in the direction of an arrow shown in FIG. 2 (optical axis direction). When the first focus ring 70 slides and the contact portion 70D of the first focus ring 70 is moved to the position (hereinafter, referred to as a "first slide position") shown in FIG. 2 where the contact portion 70D rides over a convex portion 76A of the elastic member 76 for clicking, the clutch portion (gear) 70A formed at the end of the first focus ring 70 is engaged with the clutch portion (gear) 72A formed at the end of the second focus ring 72. Therefore, the first focus ring 70 and the second focus ring 72 can be integrally rotated.

Meanwhile, when the first focus ring 70 slides to the left direction of FIG. 2 and the contact portion 70D of the first focus ring 70 is moved to a predetermined position (hereinafter, referred to as a "second slide position") where the contact portion 70D rides over the convex portion 76A of the elastic member 76 for clicking, the clutch portions 70A and 72A are disengaged from each other. In this way, the first focus ring 70 can be rotated endlessly.

Therefore, when the first focus ring 70 slides and the contact portion 70D of the first focus ring 70 rides over the convex portion 76A of the elastic member 76 for clicking and is moved to the first slide position or the second slide position, click force is generated and a click feeling is obtained.

Figure 3:
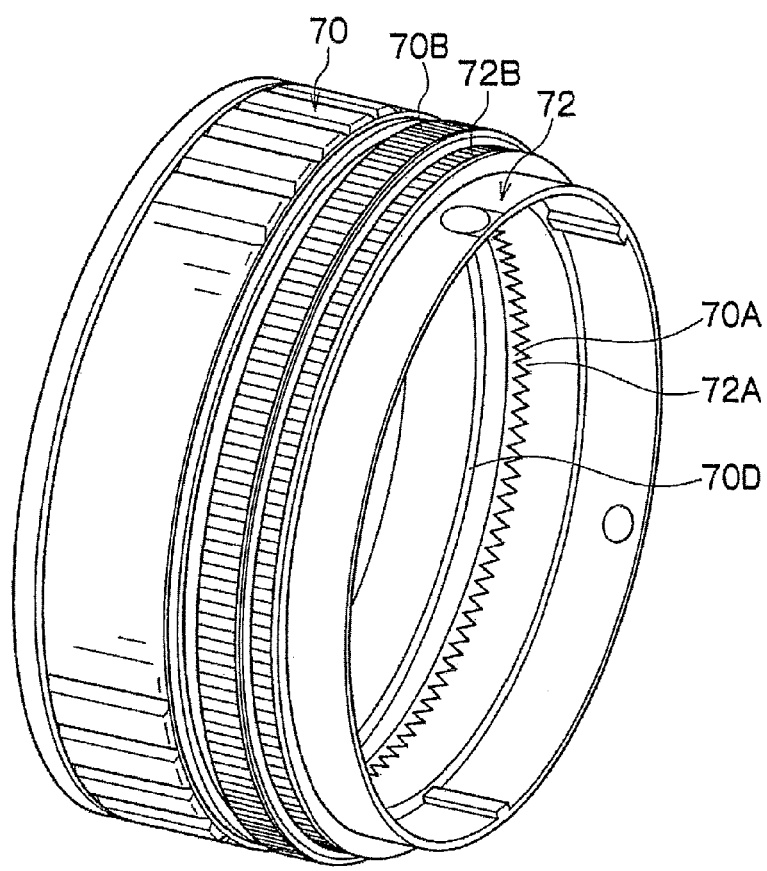
FIG. 3 is a perspective view illustrating a first focus ring and a second focus ring according to the embodiment of the invention connected to each other.

FIG. 3 is a perspective view illustrating the first focus ring 70 and the second focus ring 72 connected to each other.

Each of the first focus ring 70 and the second focus ring 72 is made of polycarbonate. In this way, it is possible to make the linear expansion coefficient of each of the first focus ring 70 and the second focus ring 72 equal to that of the front fixed ring 12 made of an aluminum alloy and improve the rigidity of the first focus ring 70 and the second focus ring 72.

In the state shown in FIG. 3, as described above, the clutch portion (gear) 70A of the first focus ring 70 is engaged with the clutch portion (gear) 72A of the second focus ring 72.

As shown in FIG. 3, the contact portion 70D is formed over the entire inner circumferential surface of the first focus ring 70. In this way, when the first focus ring 70 slides, it is possible to perform a click operation regardless of the rotational position of the first focus ring 70.

Figure 4:
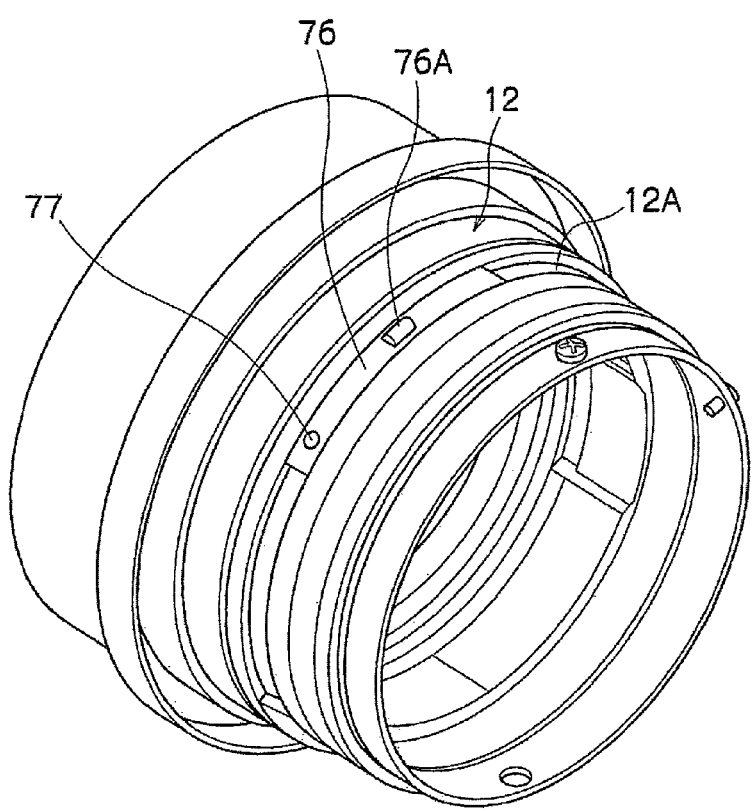
FIG. 4 is a perspective view illustrating a front fixed ring of the lens barrel body according to the embodiment of the invention.

FIG. 4 is a perspective view illustrating the lens barrel body mainly including the front fixed ring 12.

A sliding surface which comes into contact with the inner circumferential surfaces of the first focus ring 70 and the second focus ring 72 is formed on the outer circumference of the front fixed ring 12 to which the first focus ring 70 and the second focus ring 72 are fitted.

A groove 12A for attaching the elastic member 76 for clicking is formed in the outer circumference of the front fixed ring 12. The width and depth of the groove 12A correspond to the width and maximum thickness of the elastic member 76 for clicking.

Figure 5:
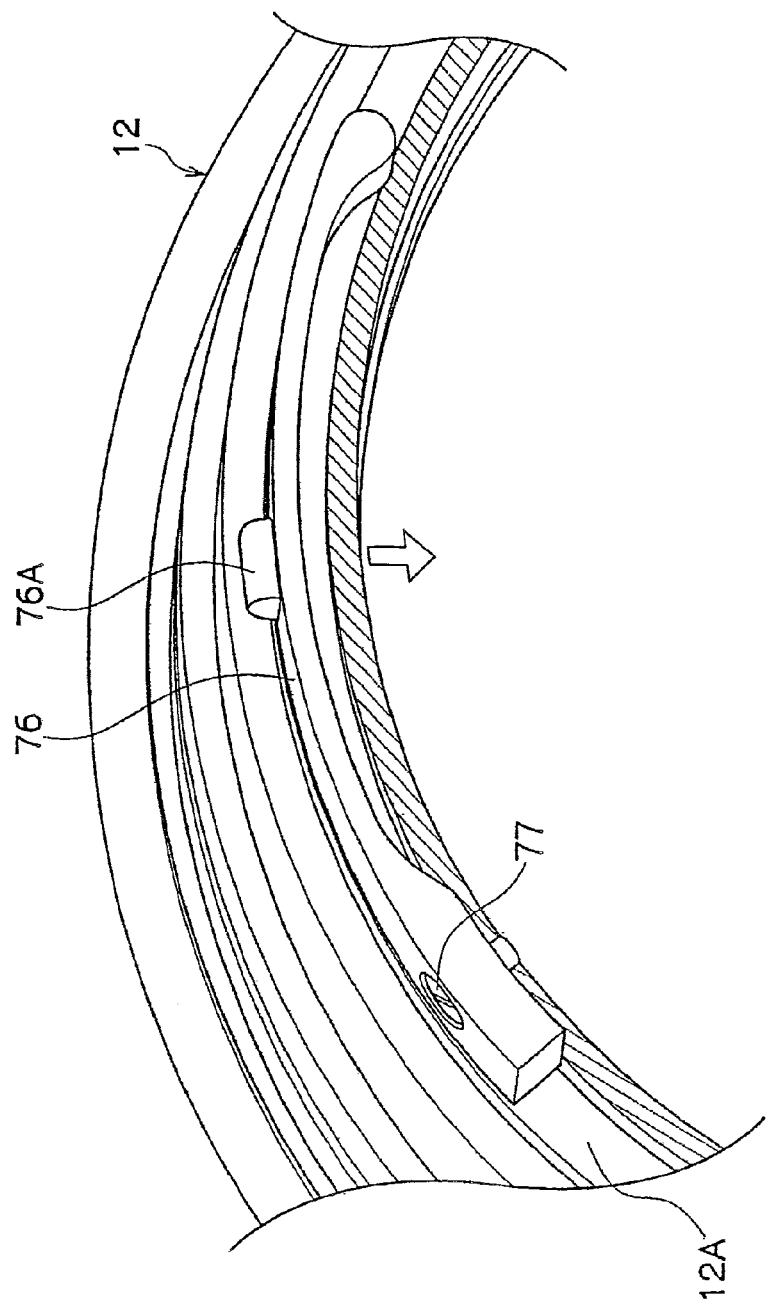
FIG. 5 is a perspective view illustrating a main part of the front fixed ring shown in FIG. 4.
Figure 6:
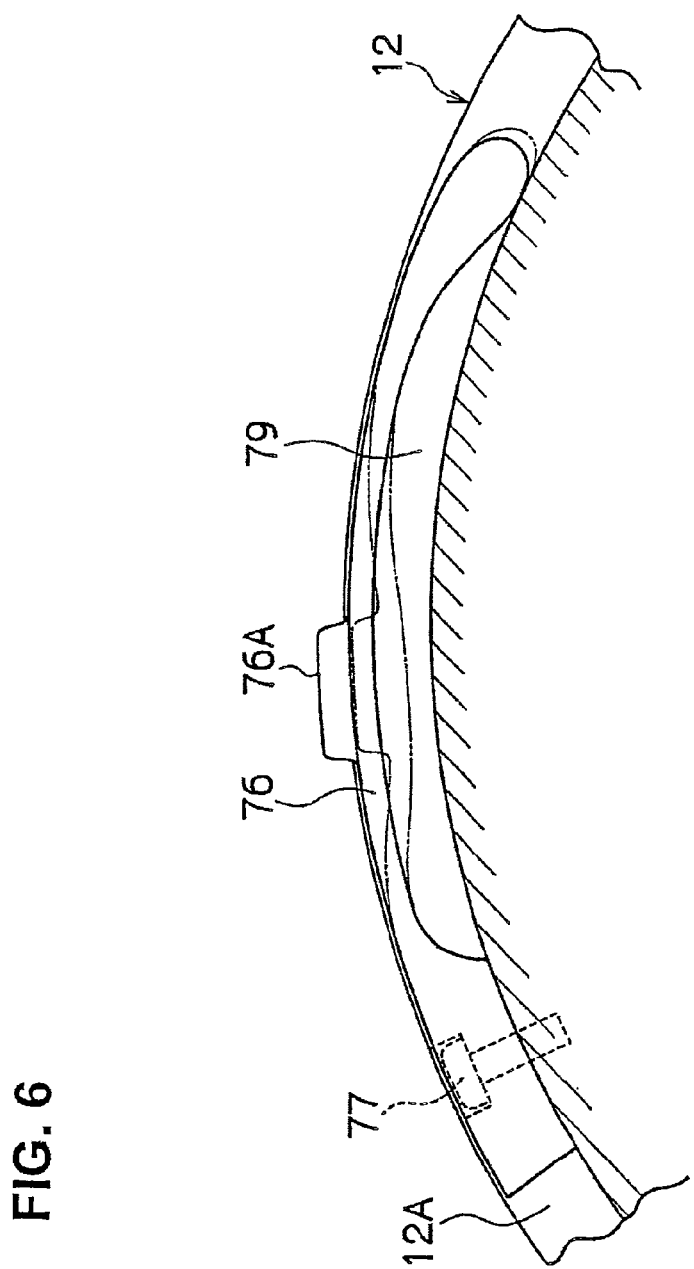
FIG. 6 is a cross-sectional view illustrating a main part of the front fixed ring shown in FIG. 4.
Figure 7:
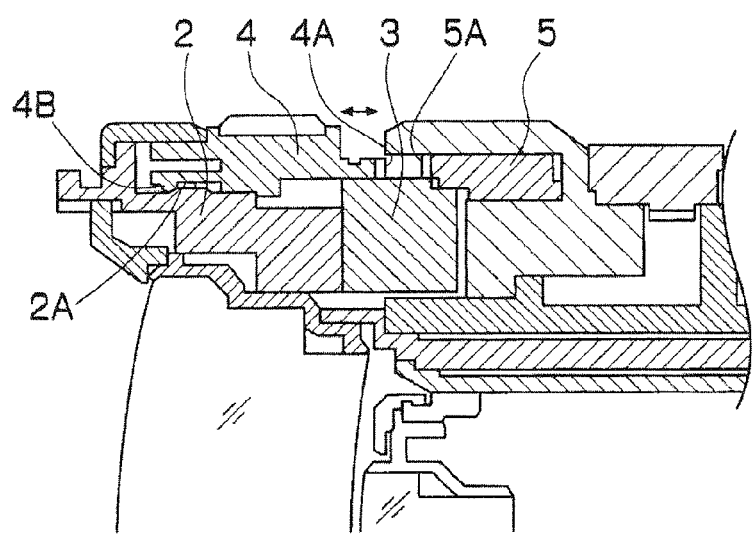
FIG. 7 is a side cross-sectional view illustrating a main part of a lens device according to the related art.

FIG. 5 is a perspective view illustrating a main part of the front fixed ring 12 shown in FIG. 4, and FIG. 6 is a cross-sectional view illustrating a main part of the front fixed ring 12.

The elastic member 76 for clicking is made of plastic with high slidability (specifically, polyacetal (POM)).

As shown in FIGS. 4 and 5, the elastic member 76 for clicking is an arc-shaped beam and is arranged in the groove 12A formed in the outer circumference of the front fixed ring 12. One end of the elastic member 76 for clicking is fixed to the front fixed ring 12 by a screw 77 and the other end thereof slidably contacts the inner surface of the groove 12A formed in the front fixed ring 12.

The convex portion 76A with a semicylindrical shape is formed in a central portion of the upper surface of the elastic member 76 for clicking (FIG. 5). In addition, the thickness of the elastic member 76 for clicking is small except for both ends such that a space 79 for bending can be formed between the elastic member 76 for clicking and the surface of the front fixed ring 12.

When the first focus ring 70 slides and the contact portion 70D (FIG. 2) formed on the inner circumferential surface of the first focus ring 70 contacts and presses the convex portion 76A of the elastic member 76 for clicking, the elastic member 76 for clicking is bent as represented by a two-dot chain line in FIG. 6 and the non-fixed other end of the elastic member 76 for clicking slides along the surface of the front fixed ring 12.

As such, when the first focus ring 70 slides and the contact portion 70D of the first focus ring 70 rides over the convex portion 76A against the elastic force of the elastic member 76 for clicking and is moved to the first slide position or the second slide position, click force is generated and a click feeling is obtained.

[Others]

In this embodiment, the contact portion 70D formed on the inner circumferential surface of the first focus ring 70 has a triangular shape in a cross-sectional view having two inclined planes, but the invention is not limited thereto. For example, the contact portion 70D may have various other shapes, such as a semicircular shape in a cross-sectional view. Similarly, the shape of the convex portion 76A formed on the elastic member 76 for clicking is not limited to the semicylindrical shape.

The number of elastic members for clicking provided at the equally divided positions on the circumference of the lens barrel body is not limited to that in this embodiment.

In this embodiment, the click mechanism of the focus ring has been described, but the invention is not limited thereto. The invention can be applied to the click mechanism of any ring member in the sliding direction that rotates around the lens barrel body and slides in the optical axis direction.

The invention is not limited to the above-described embodiment, but various modifications and changes of the invention can be made without departing from the scope and spirit of the invention.

What is claimed is:

1. A lens device comprising:
   a ring member that is provided so as to be rotatable with respect to a lens barrel body and slidable in an optical axis direction; and
   a click mechanism that performs a click operation of the ring member when the ring member is moved to a first slide position or a second slide position,
   wherein the click mechanism includes:
   elastic members for clicking which have an arc shape and are provided at a plurality of equally divided positions on the circumference of the lens barrel body and each of which has one end fixed to the lens barrel body and the other end slidably contacted with the surface of the lens barrel body and includes a convex portion formed on an upper surface of a central portion and a bending space formed by reducing the thickness of a portion other than both ends; and
   a contact portion that is formed along a central portion of an inner circumferential surface of the ring member, comes into contact with the convex portion of the elastic member for clicking when the ring member is moved to the first slide position or the second slide position to bend the elastic member for clicking, and rides over the convex portion.

2. The lens device according to claim 1,
   wherein the elastic member for clicking is made of plastic with high slidability.

3. The lens device according to claim 1,
   wherein the ring member is made of polycarbonate, and the elastic member for clicking is made of polyacetal.

4. The lens device according to claim 1,
   wherein the elastic members for clicking are provided at three equally divided positions on the circumference of the lens barrel body.

5. The lens device according to claim 1,
   wherein the convex portion formed at the center of the upper surface of the elastic member for clicking has a semicylindrical shape.

6. The lens device according to claim 1,
   wherein a groove having a width and depth corresponding to the width and maximum thickness of the elastic member for clicking is formed around the lens barrel body, and
   the elastic members for clicking are provided along the groove.

7. The lens device according to claim 1, further comprising:
   a first focus ring that is the ring member;
   a second focus ring that is arranged so as to be rotatable with respect to the lens barrel body only in a predetermined rotation range;
   a clutch unit that connects the first focus ring to the second focus ring or disconnects the first focus ring from the second focus ring with the movement of the first focus ring to the first slide position or the second slide position in the optical axis direction; and
   a focus mode switching unit that performs switching between a first focus mode that outputs an absolute position signal corresponding to the rotational position of the second focus ring when the first focus ring is moved to the first slide position as an instruction to move a focus lens and a second focus mode that outputs a relative position signal corresponding to the amount of rotation of the first focus ring when the first focus ring is moved to the second slide position as an instruction to move the focus lens.

8. The lens device according to claim 7,
   wherein each of the first focus ring and the second focus ring is provided on one fixed ring forming the lens barrel body.

* * * * *